Feb. 16, 1960  H. E. WHITTEMORE  2,925,203
VOLUMETRIC FEEDER
Filed Dec. 18, 1957  2 Sheets-Sheet 2
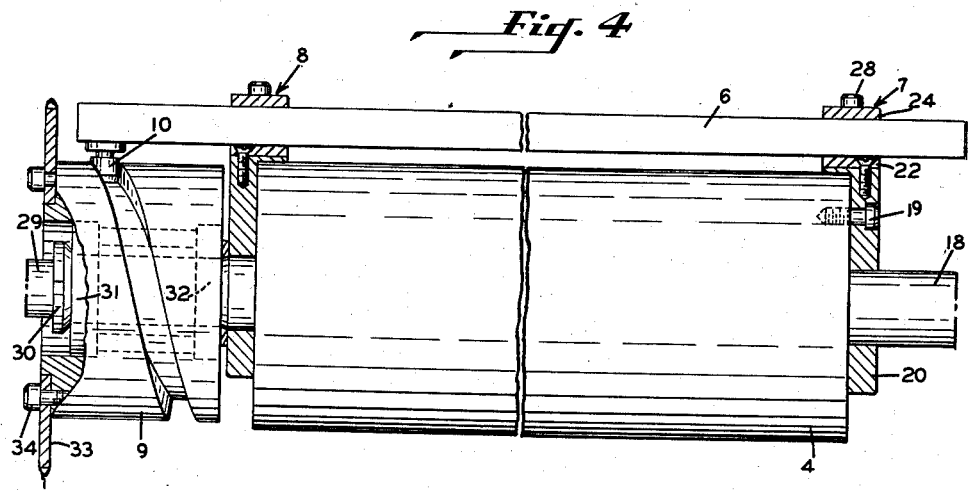
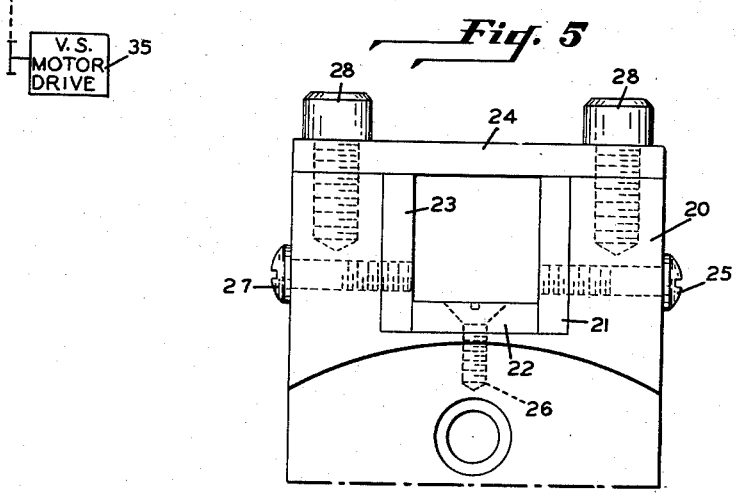
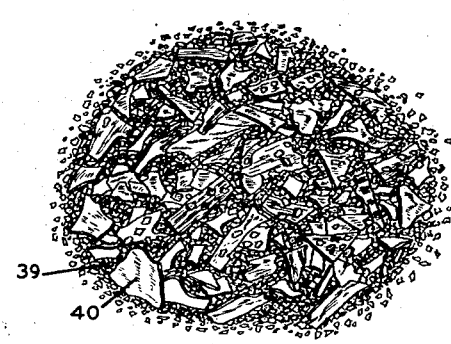
INVENTOR
HAROLD E. WHITTEMORE
ATTORNEY

United States Patent Office 2,925,203
Patented Feb. 16, 1960

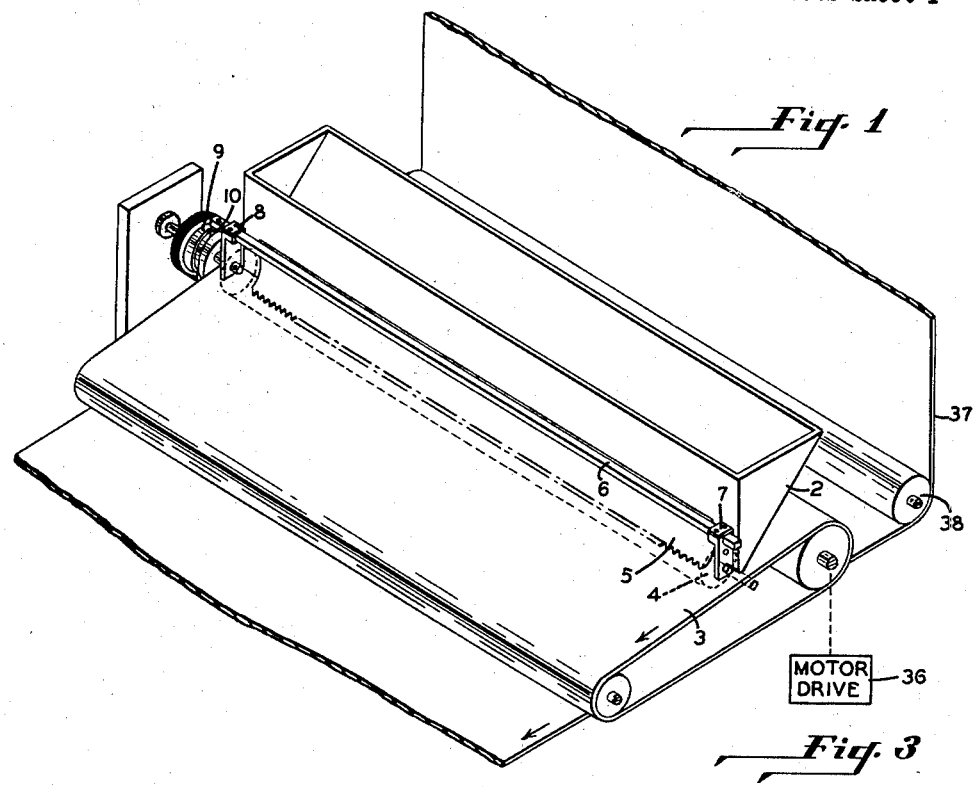
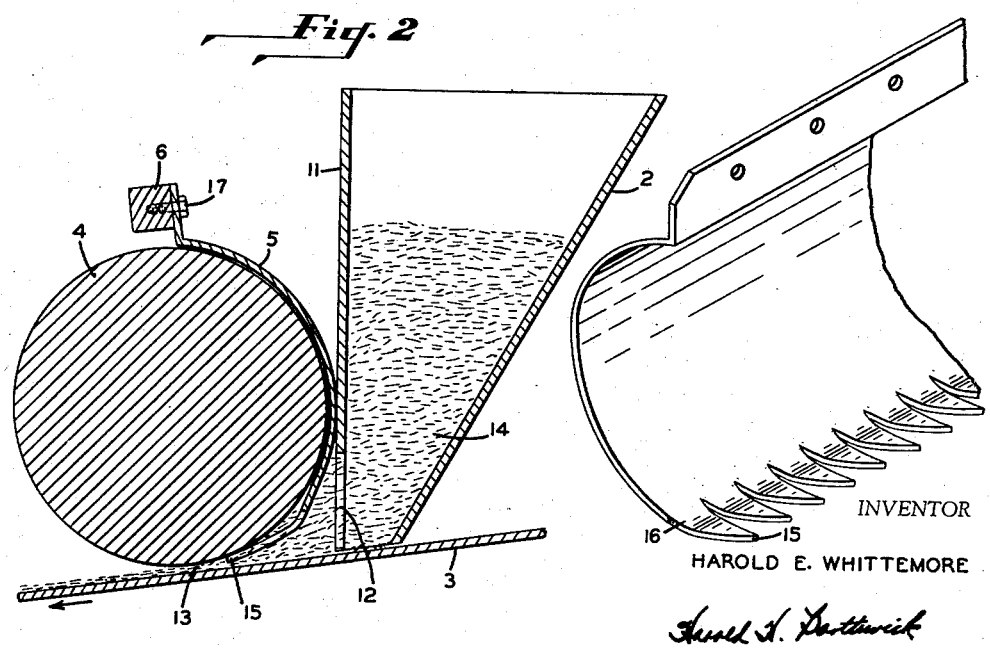
INVENTOR
HAROLD E. WHITTEMORE
ATTORNEY

2,925,203

VOLUMETRIC FEEDER

Harold E. Whittemore, East Hempfield Township, Lancaster County, Pa., assignor to Armstrong Cork Company, Lancaster, Pa., a corporation of Pennsylvania Application December 18, 1957, Serial No. 703,627

10 Claims. (Cl. 222—227)

This invention relates to a volumetric feeder. It is concerned more particularly with a volumetric feeder which deposits a layer of particles onto a moving surface such as a web of fabric or felt. The invention finds particular usefulness in the manufacture of floor and wall coverings where a layer of particles of plastic material is deposited upon a backing or foundation web for consolidation under heat and pressure into a floor covering.

One type of floor covering now manufactured is produced by combining irregularly shaped flakes of plastic material, such as flakes of filled and pigmented vinyl chloride compositions with granules of similar plastic composition. The flakes and granules are deposited upon a backing of waterproof felt as an essentially uniform layer, and the mass of plastic composition is consolidated into a sheet on the backing felt by the application of heat and pressure. The final sheet has a wearing surface which resembles a terrazzo or a mosaic floor in appearance, the flakes of vinyl chloride compositions of different colors or shades representing the stone particles, and the finer granules representing principally the mortar between the stone particles.

One of the major problems in the production of this type of material is to deposit an essentially uniform layer of the mixture of flakes and granules onto the backing web. The layer of plastic composition as finally consolidated onto the backing web may be about .030" thick, and prior to consolidation, the applied layer may be about .100" thick. The flakes may be about ½" to ¾" in maximum dimension and about .015" thick. They are generally formed by fracturing or cutting a sheet of plastic material of that thickness into pieces which vary in size from quite small flakes up to those of maximum dimension as mentioned above. The granular material may be graded in size from about 6 mesh to 10 mesh, in a typical mix. It is difficult to feed a mass of this kind as a uniform, relatively thin layer with the conventional volumetric feeders.

One type of volumetric feeder now in use in the fabrication of floor coverings of the kind described above includes a hopper for the reception of the material to be fed, a continuously moving delivery belt which is disposed below the hopper and which receives the material discharged from the hopper and delivers it as a layer onto the continuously advancing web of backing felt. Generally, the lower wall of the hopper is eliminated or is provided with an opening through which the particulate material may flow onto the delivery belt. The front wall of the hopper also is cut away to permit discharge of material from the hopper. A metering roll is positioned in advance of the open front wall of the hopper and is spaced above the delivery belt a distance about equivalent to the thickness of the layer to be formed on the delivery belt. The metering roll is generally rotated in a direction opposite to the direction of movement of the delivery belt. The desired uniformity in the thickness of the applied layer is not achieved when this type of volumetric feeder is used, particularly when the material being fed includes relatively large but thin flakes.

Another deficiency of this type of feeder is a lack of adequate control of the orientation and distribution of the flakes with respect to the granules which make up the mass. There is essentially no interspersion of the flakes and granules after deposit of the mass into the hopper; for while the metering roll may be rotated in a direction opposite to the direction of movement of the delivery belt, the metering roll is smooth surfaced and is rotated quite slowly.

An object of the present invention is to provide a volumetric feeder which will operate satisfactorily in feeding flake materials to deposit a relatively uniform volume of the material.

Another object of the invention is to provide a volumetric feeder which will effect an interspersion of flakes and granules of material as the same are deposited by the feeder.

Other objects of the invention will be clear from the following description of an embodiment of the invention.

According to the present invention, a volumetric feeder is provided including a conventional hopper and metering member, preferably a metering roll. The metering roll is disposed with respect to a delivery surface disposed below the roll to form a discharge chamber of decreasing volume. The delivery surface may be the surface of a delivery belt, or where the feeder is arranged to deposit the mixture directly, the delivery surface may be the backing felt itself or other surface which is to receive the material being fed. There is combined with these elements a toothed comb which is disposed between the metering roll and the hopper and projects partially into the discharge chamber formed by the metering roll and the delivery surface. Mechanism is provided for reciprocating the toothed comb back and forth in front of the delivery opening in the hopper.

In order that the invention may be more readily understood, a description of an embodiment of the invention is given in conjunction with the attached drawings, in which:

Figure 1 is a diagrammatic perspective view showing the volumetric feeder of the invention positioned to deliver material onto a backing web in the fabrication of a floor covering;

Figure 2 is an enlarged sectional view showing a portion of the feeder of Figure 1 and diagrammatically illustrating its action;

Figure 3 is a perspective view of a portion of one form of toothed comb element;

Figure 4 is a front elevational view, partly in section, and partly broken away, showing the metering roll and mechanism for reciprocating the toothed comb (the comb has been removed in this view for clarity of illustration);

Figure 5 is a detailed view to an enlarged scale showing the bearing guide for the toothed comb supporting rod; and Figure 6 is a plan view illustrating a mass of flaked and granulated material of the type which may be fed successfully with the feeder.

Referring to Figure 1, the feeder comprises a hopper 2, a delivery belt 3, a metering member 4 in the form of a roll which has been shown in dotted lines to indicate the relationship with the toothed comb 5 which is positioned closely adjacent to the metering roll. The comb 5 is mounted upon a supporting bar 6 which is guided in bearings 7 and 8 and is arranged for reciprocatory movement by a shrouded cam 9 which receives a cam follower 10 attached to the supporting bar 6.

Referring to Figure 2, the hopper 2 is provided with a front wall 11 which has an opening 12 therein. The depth of this opening will vary depending upon the type of material to be fed; but with flake and granular material as discussed above, the opening may be 2" or 3"

deep and may extend throughout substantially the full width of the hopper. For the production of a 6' wide floor covering, the hopper may be about 6' 4" in length.

Mounted forwardly of the wall 11 is a metering member 4 in the form of a roll. This roll is not rotated; it is fixed in stationary position but may be moved to various adjusted positions if wear occurs on its surface. The metering roll 4 is disposed above the upper surface of the delivery belt 3 and provides with the delivery belt 3 a discharge chamber 13 through which material 14 to be fed, such as the flakes and granules diagrammatically shown in Figure 2, must pass and be metered by the metering roll 4 as the delivery belt 3 advances in the direction of the arrow shown in Figure 2.

The toothed comb is preferably contoured so as to lie closely adjacent to the surface of the roll 4 throughout the major extent of the comb, with the tips 15 of the teeth of the comb preferably engaging the surface of the roll 4 as shown in Figure 2. The comb may be made of sheet metal, about $\frac{1}{16}$" thick, for example. The teeth are contoured so that at their roots (Figure 3) they are spaced a slight distance from the surface of the roll as shown in Figure 2. With material of the type described above, this spacing between the roll and the teeth may be about $\frac{1}{4}$". The teeth may be about $\frac{3}{4}$" wide at the root, and 2" deep from tip 15 to root 16. It will be observed in Figure 2 that the teeth are disposed slightly to the rear of the line of maximum convergence between the metering roll 4 and the delivery belt 5. A spacing of about 1" from such line has been found to be acceptable with flake and granular material of the type described above.

The toothed comb 5 is secured to the supporting bar 6 by a plurality of machine screws 17. Referring to Figure 4, it will be observed that the bar 6 passes through bearing 7 which is secured to the metering roll 4, an end plate of the bearing arrangement being received over shaft 18 which projects from the metering roll 4 and being held in position by a hollow head set screw 19 which passes through the bearing support and is received within a threaded opening in the roll 4. This bearing arrangement is shown in detail in Figure 5 and includes a bearing end plate 20 which receives bearing plates 21, 22, 23, and 24 which are fastened to the end plate 20 by screws 25, 26, 27, and 28.

Bearing 8 on the opposite end of the metering roll is of similar construction, but it is held against rotation on shaft 29 of the metering roll 4 by a set screw (not shown) in the end plate of the bearing support and by a clamping nut 30 which presses against ball bearings 31 and 32 for cam 9 as will be more fully described below.

Shrouded cam 9 is mounted for free rotation on shaft 29 on the ball bearings 31 and 32. A driving sprocket 33 is attached to the shrouded cam 9 by hollow head screws 34. A variable speed motor drive 35 is provided for rotating the shrouded cam, as diagrammatically shown in Figure 4.

The extent of reciprocatory movement of the toothed comb and the speed of reciprocation will vary with different types of material being fed. In the typical type of flake and granular material referred to above, a 1" movement of the toothed comb at a rate of 60 reciprocations per minute has been found to be acceptable. While in some installations it may be possible to drive the cam 9 in synchronism with the movement of the delivery belt 3, it is preferred to have separate motor drives for the delivery belt and the cam so that independent adjustments may be made. A motor drive for the belt 3 has been indicated diagrammatically at 36 in Figure 1.

In operation of the device, the particles to be fed are charged into the hopper 2, and the motors 35 and 36 are started up. The delivery belt moves below the hopper 2 and carries with it on its surface flakes and granules from the mass 14 in the hopper 2 and in the area between the hopper 2 and the metering roll 4, delivering the material into the discharge chamber 13. The toothed comb 5 is reciprocated back and forth and tends to intersperse the flakes and granules and breaks up any tendency of the flakes to bridge at the entrance end of the discharge chamber. A uniform deposit of the material onto the delivery belt is effected. In a typical example, this may be a layer about .100" thick and about 76" wide. The belt 3 may be arranged to travel at a speed of about 5' per minute. The material deposited on the belt 3 is delivered from the belt and falls by gravity onto the surface of a web of backing felt 37 which is guided under the delivery belt 3 by a roll 38. The belt may be about 76" wide and may be moved at a speed of about 14' per minute, somewhat faster than the speed of the delivery belt 3. This will form a layer of flaked and granular material about .100" thick on the backing layer.

While it is customary to deliver the material onto a delivery belt and transfer it to the backing web, since this provides better thickness control for thin layers of material, the device of this invention is applicable also to systems where the material is deposited directly onto the backing web, in which event the delivery belt will be eliminated and the surface of the backing web will constitute the delivery surface. Similarly, the device may be arranged to feed a calender, and a delivery belt may be used or the material may be deposited onto one of the calender rolls, serving as a delivery surface, adjacent to the nip.

As mentioned previously, it is preferred to use a metering roll, but obviously other metering means may be substituted, such as a curved metering bar or shoe.

The device of this invention is particularly adapted for the feeding of flaked and granular materials as shown in Figure 6 where the granules have been indicated at 39 and flakes at 40. It is obvious, however, that the device of the invention may be used in the feeding of other materials.

I claim:

1. A volumetric feeder comprising a delivery member, a hopper disposed above said delivery member for the reception of particles to be deposited in a predetermined volume on the surface of said delivery member, said hopper having a delivery opening in the front wall thereof, an arcuate metering member disposed above said delivery member and extending forwardly of the delivery opening in said front wall of said hopper and defining a curved metering surface leading from said delivery opening in said hopper toward the surface of said delivery member and forming a discharge chamber of decreasing volume between the metering member and said delivery member, a toothed comb disposed between said metering member and said delivery member forward of said delivery opening in the front wall of said hopper and projecting partially into said discharge chamber for disposition of its teeth in the volume of particles disposed on said delivery member in said discharge chamber, means for reciprocating said comb back and forth in front of said delivery opening in said hopper, and means for moving said delivery member below said metering member in a direction to convey said particles from said delivery opening in said hopper into and through said discharge chamber.

2. A volumetric feeder comprising a delivery member, a hopper disposed above said delivery member for the reception of particles to be deposited in a predetermined volume on the surface of said delivery member, said hopper having a delivery opening in the front wall thereof, a metering roll disposed above said delivery member and extending forwardly of the delivery opening in said front wall of said hopper and defining a curved metering surface leading from said delivery opening in said hopper toward the surface of said delivery member and forming a discharge chamber of decreasing volume between said metering roll and said delivery member, a toothed comb disposed between said metering roll and said delivery member forward of said delivery opening in the front wall of said hopper and projecting partially into said discharge chamber for disposition of its teeth within the volume of particles disposed on said delivery member in said discharge chamber, means for reciprocating said comb back and forth in front of said delivery opening in said hopper, and means for moving said delivery member below said metering roll in a direction to convey said particles from said delivery opening in said hopper into and through said discharge chamber.

3. A volumetric feeder comprising a delivery belt, a hopper disposed above said delivery belt for the reception of particles to be deposited in a predetermined volume on the surface of said delivery belt, said hopper having a delivery opening in the front wall thereof, a metering roll disposed above said delivery belt and extending forwardly of the delivery opening in said front wall of said hopper and providing a curved metering surface leading from said delivery opening in said hopper toward the surface of said delivery belt and forming a discharge chamber of decreasing volume between said metering roll and said delivery belt, a toothed comb disposed between said metering roll and said delivery belt forward of said delivery opening in the front wall of said hopper and projecting partially into said discharge chamber for disposition of its teeth within the volume of particles disposed on said delivery belt in said discharge chamber, said comb having an arcuate configuration and lying closely adjacent to the periphery of said metering roll throughout the major portion of the effective working area of said comb, with the teeth of said comb engaging the surface of said roll at their forward edges and being spaced from said roll adjacent to their roots, means for reciprocating said comb back and forth in front of said delivery opening in said hopper, and means for moving said delivery belt below said metering roll in a direction to convey said particles from said delivery opening in said hopper into and through said discharge chamber.

4. A volumetric feeder comprising a delivery belt, a hopper disposed above said delivery belt for the reception of particles to be deposited in a predetermined volume on the surface of said delivery belt, said hopper having a delivery opening in the front wall thereof, a metering member disposed above said delivery belt and extending forwardly of the delivery opening in said front wall of said hopper and defining a downwardly and forwardly inclined metering surface leading from said delivery opening in said hopper toward the surface of said delivery belt and forming a discharge chamber of decreasing volume between said metering member and said delivery belt, a toothed comb disposed between said metering member and said delivery belt forward of said delivery opening in said front wall of said hopper and projecting partially into said discharge chamber for disposition of its teeth within the volume of particles disposed on said delivery belt in said discharge chamber, means for reciprocating said comb back and forth in front of said delivery opening in said hopper, and means for moving said delivery belt below said metering member in a direction to convey said particles from said delivery opening in said hopper into and through said discharge chamber.

5. A volumetric feeder in accordance with claim 1 in which the teeth on said toothed comb are about ¾" wide at their roots and are about 2" deep from tip to root.

6. A volumetric feeder in accordance with claim 1 in which the teeth on said toothed comb engage said metering member at their tips and are spaced from said metering member about ¼" at their roots.

7. A volumetric feeder in accordance with claim 1 in which the magnitude of reciprocation of said reciprocating means is about 1".

8. A volumetric feeder in accordance with claim 7 in which said reciprocating means is reciprocated at a rate of about 60 reciprocations per minute.

9. A volumetric feeder in accordance with claim 1 in which said toothed comb is mounted on a supporting bar received within bearings for reciprocation and in which said means for reciprocating said toothed comb comprises a driven cam acting against a cam follower mounted on said supporting bar.

10. A volumetric feeder in accordance with claim 2 in which said metering roll has shafts projecting from the ends thereof, and bearings for a supporting bar for said toothed comb are received in supports positioned over said shafts and clamped to said roll, and in which said means for reciprocating said comb includes a shrouded cam freely rotatable on one of said shafts, a cam follower attached to said supporting bar and engageable with said cam, and means for rotating said cam.

References Cited in the file of this patent

UNITED STATES PATENTS

| | | |
|---|---|---|
| 289,518 | Dowling | Dec. 4, 1883 |
| 1,803,521 | Bergerioux | May 5, 1931 |
| 2,695,734 | Cook et al | Nov. 30, 1954 |
| 2,756,459 | Kellner | July 31, 1956 |